UNITED STATES PATENT OFFICE.

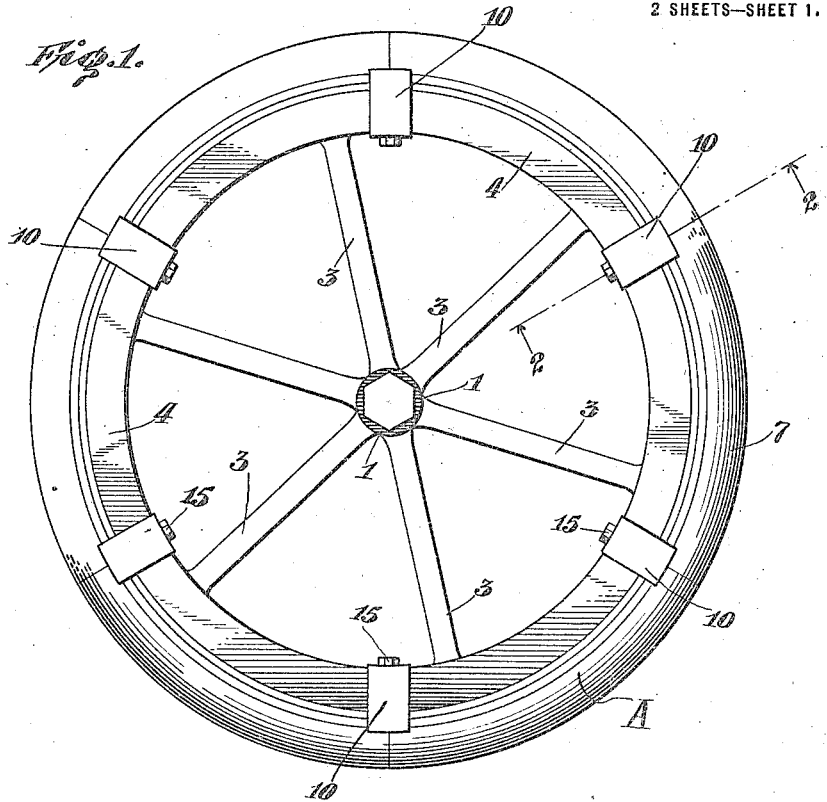
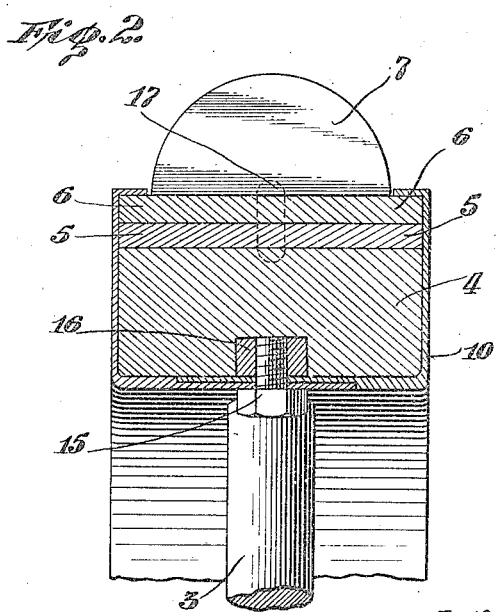

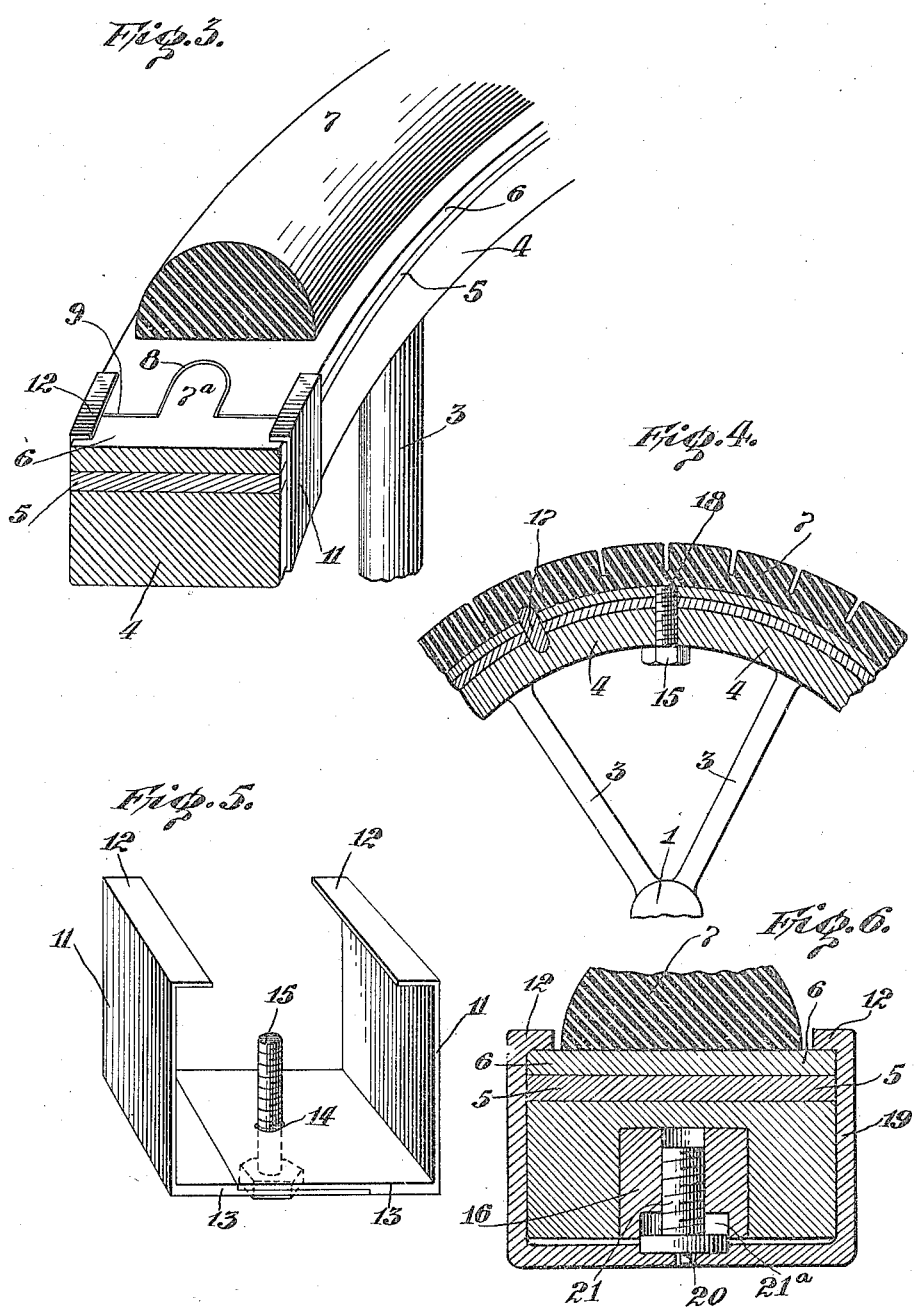

ARTHUR V. LYALL, OF NEW YORK, N. Y.

VEHICLE-WHEEL.

1,254,613.  Specification of Letters Patent.  Patented Jan. 22, 1918.

Application filed January 10, 1911. Serial No. 601,862.

*To all whom it may concern:*

Be it known that I, ARTHUR V. LYALL, a citizen of the United States, residing in the city, county, and State of New York, have invented certain new and useful Improvements in Vehicle-Wheels, of which the following is a specification.

This invention relates to vehicle wheels and particularly those having an outer tread of rubber or other elastic material, and has for its object the provision of means whereby sections of the outer tire may be removed without removing or renewing any of the other tire sections. Further objects of my invention are to provide means for attaching the tire sections to the wheels and for preventing movement of the tire sections with respect to one another and to the wheel, either laterally or circumferentially.

By means of my invention I obtain great economies, since it is necessary only to renew that portion of the tire which has become cut or too badly worn for further use, and by inserting a new section of the same cross section as the adjoining sections I can use the vehicle tire until practically all of it has been worn away.

Another advantage of my invention is that due to the means used to attach the rim sections and fix the same in place. No creeping or circumferential movement of the tire with respect to the wheel takes place, so that I obtain a greater traction upon accelerating the vehicle.

Referring to the drawings, Figure 1 illustrates the side view of a wheel constructed according to my invention: Fig. 2 is a sectional view through one of the clamps, as, for instance, along the line 2 2 of Fig. 1; Fig. 3 is a perspective view of the felly, tire, and part of the wheel partly in section; Fig. 4 is a vertical section of a part of the wheel showing the application of a block tire to the wheel instead of the semicircular tire shown in Fig. 1; Fig. 5 is a detail perspective view of one of the clamps; Fig. 6 is a sectional view of the felly, rim and tire of the wheel through one of the clamps, showing a modification of the clamping means.

In the drawings, 1 represents the hub of the wheel, to which are attached spokes 3, carrying a felly 4, all of which parts are of the conventional construction. Around the felly is shrunk a continuous metal rim 5, preferably of steel or some equally substantial material. Upon this rim are fastened a plurality of metal rim members 6, shown as being six in number in the drawings, to which is attached an elastic member 7 of rubber or similar material. The sectional rim members 6 have at one end a tongue 7ª which engages a groove 8 (see Fig. 3) in the adjoining rim section, in order to prevent lateral motion of one tire section with respect to the other. The rubber or other elastic material forming the outside of the tire sections is preferably made in sections and may extend between the points of juncture 9 of the rim sections or may slightly overlap the joints.

In order to attach the rim sections to the continuous rims surrounding the wheel felly, I have provided clamps 10. These clamps are attached immediately over the point of juncture of the tire sections, although they may be attached at other places upon the periphery of the wheel if it is desired to secure additional strength. These clamps consist of two embracing members 11, which are provided at their outer ends with lips 12 adapted to overlap and engage the metal rim sections and are bent inwardly at their inner ends, as at 13, so as to overlap. The inner ends 13 of the clamps are provided with holes 14, which register when the clamps are in position, and through which a bolt 15 extends, which is screwed into a nut 16, embedded in the wheel felly.

In order to secure the tire sections against circumferential movement, the tire sections are provided with pins 17, which engage corresponding holes in the continuous rim of the wheel, and may, if desired, extend to the felly.

For further preventing circumferential movement and for more rigidly attaching the tire sections to the wheels when it is necessary, I insert bolts 18 through the felly and metal rim, and screw the same into the tire sections (see Fig. 4).

In Fig. 6 is illustrated a modification of the clamping device. In this modification the clamp consists of a continuous piece of metal 19 having a hole 20 at its inner side. The screw 21 may be screwed into a recess 21ᴬ in the nut 16 in the wheel felly, so that the clamp may be slipped over the screw 21 into the position shown in Fig. 6. When it is desired to tighten the clamp it is only necessary to unscrew the screw 21, thus bringing the lips 12 of the clamp in engagement with the metal rim section 6 of the tire.

The operation of my device is as follows: When it is desired to replace one of the sections of a tire, say for instance that marked A in Fig. 1, the nuts 15 of the clamps 10 at the ends of this section are removed, thus enabling the clamps 10 to be removed and the tire section A to be lifted out of place. Another tire section of appropriate size is then put in place of the tire section A, the pins 17 fitting down into their corresponding holes in the continuous metal rim, the clamps are again placed in position and the bolts 15 re-inserted.

If the modified clamp shown in Fig. 6 is used, the screw 21 is screwed down into the felly, thus loosening the clamp, and the clamp is slipped along the rim until the tire section can be lifted off. When the tire section has been replaced, the clamp is again slipped into place and the screw 21 unscrewed.

While I have described and illustrated the form of my invention which now appears to me to be preferable, I do not wish to be confined to the form shown and described, as it is apparent that many modifications of the device may be made without departing from the spirit of my invention.

What I claim and desire to secure by Letters Patent is:

A wheel comprising a felly, a sectional metal rim surrounding said felly, a section of rubber tire vulcanized to each section of said sectional rim, clamps for securing said sectional rim to said felly, each clamp comprising a pair of substantially L-shaped members the bases of which are adapted to overlap each other on the interior of the felly and the stems of which are provided with lips adapted to overlap the ends of adjacent sections of said sectional rim, and means to retain said members in position.

ARTHUR V. LYALL.

Witnesses:
RAMSAY HOGUET,
WALTER S. JONES.

Copies of this patent may be obtained for five cents each, by addressing the "Commissioner of Patents, Washington, D. C."